United States Patent
Zhou et al.

(10) Patent No.: US 9,637,110 B2
(45) Date of Patent: May 2, 2017

(54) TORQUE DISTRIBUTION METHOD FOR ENGINE AND MOTOR OF ENERGY-EFFICIENT HYBRID ELECTRIC VEHICLE

(71) Applicant: SAIC MOTOR CORPORATION, LTD., Shanghai (CN)

(72) Inventors: Yuxing Zhou, Shanghai (CN); Jun Zhu, Shanghai (CN); Xiaoguang Deng, Shanghai (CN); Feifei Zhang, Shanghai (CN); Yi Zhao, Shanghai (CN)

(73) Assignee: SAIC Motor Corporation, LTD., Shanghai (CN)

( * ) Notice: Subject to any disclaimer, the term of this patent is extended or adjusted under 35 U.S.C. 154(b) by 44 days.

(21) Appl. No.: 14/649,513

(22) PCT Filed: Dec. 3, 2013

(86) PCT No.: PCT/CN2013/088427
§ 371 (c)(1),
(2) Date: Jun. 3, 2015

(87) PCT Pub. No.: WO2014/090101
PCT Pub. Date: Jun. 19, 2014

(65) Prior Publication Data
US 2015/0314773 A1  Nov. 5, 2015

(30) Foreign Application Priority Data

Dec. 10, 2012  (CN) .......................... 2012 1 0526797

(51) Int. Cl.
*B60W 10/06* (2006.01)
*B60W 10/08* (2006.01)
(Continued)

(52) U.S. Cl.
CPC ............. *B60W 20/108* (2013.01); *B60K 6/48* (2013.01); *B60W 10/06* (2013.01); *B60W 10/08* (2013.01);
(Continued)

(58) Field of Classification Search
CPC ...... B60W 10/06; B60W 10/08; B60W 20/00; B60W 20/10; B60W 20/108; B60W 20/13;
(Continued)

(56) References Cited

U.S. PATENT DOCUMENTS 5,842,534 A  12/1998 Frank
8,249,768 B2  8/2012 Mori et al.
(Continued)

FOREIGN PATENT DOCUMENTS

AT  9756 U1  3/2008
CN  101428610 A  5/2009
(Continued)

OTHER PUBLICATIONS

Horsepower to Torque Calculator, Formula.pdf (Horsepower to Torque Calculator, Formula, http://ncalculators.com/electrical/horsepower-to-torque-calculator.htm as archived at https://web.archive.org/web/20111018063530/http://ncalculators.com/electrical/horsepower-to-torque-calculator.htm, Oct. 18, 2011, pp. 1-3).*

(Continued)

*Primary Examiner* — Bao Long T Nguyen
(74) *Attorney, Agent, or Firm* — Fenwick & West LLP

(57) ABSTRACT

A torque distribution method for an engine and a motor of an energy-efficient hybrid electric vehicle comprises the following steps: providing an offline specific fuel consumption map of the engine in all operating states; enabling the engine and motor to respond to the required torque T during travelling together, the motor and the engine working in (Continued)

cooperation at the same rotational speed so as to achieve the optimal working efficiency; acquiring a current state of charge (SOC) of the vehicle battery, and distributing the engine torque T and the motor torque T according to the following situation: if the SOC is greater than a first preset value, entering a first distribution mode; if the SOC is less than a second preset value, enter a second distribution mode; and otherwise, maintaining the current working state. The method can fully utilize the performance advantage of the engine and that of the motor, so that the system works at high efficiency all the time, thereby decreasing the energy consumption of the vehicle, greatly reducing harmful emission, and facilitating energy conservation and environmental protection.

19 Claims, 3 Drawing Sheets

(51) Int. Cl.
*B60W 20/00* (2016.01)
*B60K 6/48* (2007.10)
*B60W 20/15* (2016.01)
*B60W 20/13* (2016.01)
*B60W 20/10* (2016.01)

(52) U.S. Cl.
CPC ............ *B60W 20/00* (2013.01); *B60W 20/10* (2013.01); *B60W 20/13* (2016.01); *B60W 20/15* (2016.01); *B60W 2510/0623* (2013.01); *B60W 2510/0657* (2013.01); *B60W 2510/0666* (2013.01); *B60W 2510/244* (2013.01); *B60W 2710/0666* (2013.01); *B60W 2710/0672* (2013.01); *B60W 2710/083* (2013.01); *Y10S 903/93* (2013.01)

(58) Field of Classification Search
CPC ......... B60W 20/15; B60W 2510/0623; B60W 2510/0657; B60W 2510/0666; B60W 2510/244; B60W 2710/0666; B60W 2710/0672; B60W 2710/083; B60W 10/04; B60W 10/26; B60W 20/11; B60W 50/0097; B60W 2710/0677; B60W 2550/402; B60W 2050/0026; B60K 6/48; Y02T 10/6286; Y02T 10/6269; Y02T 10/6291; Y02T 90/14; Y10S 903/93
USPC .............. 701/22; 180/65.265, 65.275, 65.28, 180/65.285; 903/930
See application file for complete search history.

(56) References Cited

U.S. PATENT DOCUMENTS

| | | | |
|---|---|---|---|
| 2004/0060751 A1 | 4/2004 | Frank | |
| 2008/0064550 A1* | 3/2008 | Holmes | B60K 6/365 475/5 |
| 2010/0052581 A1* | 3/2010 | Izumi | B60K 6/48 318/400.04 |
| 2011/0130901 A1 | 6/2011 | Mori et al. | |
| 2012/0073551 A1* | 3/2012 | Branyon | F02B 33/22 123/70 R |
| 2012/0116626 A1 | 5/2012 | Perkins et al. | |
| 2012/0179317 A1 | 7/2012 | Kuberczyk | |

FOREIGN PATENT DOCUMENTS

| | | |
|---|---|---|
| CN | 101602362 A | 12/2009 |
| CN | 102358283 A | 2/2012 |
| CN | 102431550 A | 5/2012 |
| CN | 102602388 A | 7/2012 |
| CN | 102774374 A | 11/2012 |
| EP | 2476595 A2 | 7/2012 |
| JP | 2007-246009 A | 9/2007 |
| JP | 2011-63089 A | 3/2011 |
| JP | 2011-131830 A | 7/2011 |
| JP | 2012-86709 A | 5/2012 |
| JP | 2012-126327 A | 7/2012 |

OTHER PUBLICATIONS

Chinese First Office Action, Chinese Application No. 201210526797.X, Nov. 4, 2015, 6 pages (with English summary).
European Extended Search Report, European Application No. 13862482.0, Apr. 11, 2016, 8 pages.
PCT International Search Report, PCT/CN2013/088427, Jan. 30, 2014, 7 Pages.

* cited by examiner acquiring a maximum torque constraint value of the engine $T_{Eng\_maxCAN}$ in real time via the in-vehicle network, where the maximum torque constraint value $T_{Eng\_maxCAN}$ is acquired from an engine sub-system in the hybrid electric vehicles via the in-vehicle network, and the in-vehicle network is a Controller Area Network setting $T_{Eng\_pre} = T_{Eng\_Lim}$, wherein $T_{Eng\_Lim}$ is a smaller value of $T_{BSFC}$ and $T_{Eng\_maxCAN}$, $T_{Mac\_pre} = T_D - T_{Eng\_Lim}$

FIG. 4 acquiring a maximum torque constraint value of the engine $T_{Eng\_maxCAN}$ in real time via the in-vehicle network, where a smaller value of $T_{BSFC}$ and $T_{Eng\_maxCAN}$ is defined as $T_{Eng\_Lim}$, and the maximum torque constraint value $T_{Eng\_maxCAN}$ is acquired from an engine sub-system in the hybrid electric vehicles via the in-vehicle network implementing a filtering process to $T_{Eng\_Lim}$ to obtain a value of $T_{Eng\_split}$, and setting $T_{Eng\_pre} = T_{Eng\_split}$, where the filtering process filters out values to prevent intense variation, the filtering process constrains a variation rate of $T_{Eng\_Lim}$ not greater than a torque variation rate of the engine acquiring the maximum torque constraint value of the electric motor $T_{Mac\_maxCAN}$ and a minimum torque constraint value of the electric motor $T_{Mac\_minCAN}$, computing an equation $T_D - T_{BSFC} + (T_{Eng\_Lim} - T_{Eng\_split})$, wherein a smaller value of a result of the equation and $T_{Mac\_maxCAN}$ is defined as $T_{Mac\_Lim}$, further a greater value of $T_{Mac\_Lim}$ and $T_{Mac\_minCAN}$ is defined as $T_{Mac\_split}$, thereafter $T_{Mac\_pre} = T_{Mac\_split}$, where $T_{Mac\_maxCAN}$ and $T_{Mac\_minCAN}$ are acquired from an electric motor sub-system in the hybrid electric vehicles

FIG. 5

TORQUE DISTRIBUTION METHOD FOR ENGINE AND MOTOR OF ENERGY-EFFICIENT HYBRID ELECTRIC VEHICLE

CROSS-REFERENCE TO RELATED APPLICATIONS

The present application is a 371 National Stage Application of International Application No. PCT/CN2013/088427, filed on Dec. 3, 2013, which claims priority to Chinese patent application No. 201210526797.X, filed on Dec. 10, 2012, and entitled "TORQUE DISTRIBUTION METHOD FOR ENGINE AND MOTOR OF ENERGY-EFFICIENT HYBRID ELECTRIC VEHICLE", the entire disclosure of which is incorporated herein by reference.

TECHNICAL FIELD

The present disclosure generally relates to control technology of hybrid electric vehicles, and more particularly, to a method for distributing torque between an engine and an electric motor for an energy efficiency improvement of hybrid electric vehicles.

BACKGROUND

A method for distributing torque is a key to system overall energy efficiency improvement for hybrid electric vehicles with hybrid powertrain consisting of an engine and an electric motor. Basically, the engine is commanded to operate in high efficient conditions while the electric motor compensates a difference between a total torque demand and an engine torque output. However, most torque distribution strategies only consider current working conditions and an implemented instantaneous improvement may not be able to get the best solution from a view of global optimization. Torque distribution control method between the engine and electric motor for energy efficiency improvement from the view of global optimization has not been disclosed in prior arts. Accordingly, a corresponding control method for rationally distributing torque between the engine and the electric motor is needed so as to fully explore performance benefits of the engine and the electric motor and extend their service life. Especially, with effectively guaranteeing a dynamic performance of hybrid electric vehicles system, energy consumption of the hybrid electric vehicles may be reduced as much as possible so that the hybrid electric vehicle system works at high efficiency all the time.

SUMMARY

The present disclosure aims to disclose a method for distributing torque between an engine and an electric motor for hybrid electric vehicles which tries to get an improved overall system energy efficiency in whole driving tasks, instead of current driving condition only.

In order to achieve the goal, massive driving data in traffic conditions for which the hybrid electric vehicles are designed, is firstly collected and analyzed, and a most typical driving condition is derived. Then global optimization control is employed to get an energy efficiency improvement for the derived typical driving condition. Rule-based torque distribution method is concluded from a global optimization result, which takes all relevant parameters into consideration, including engine efficiency, electric motor efficiency, battery SOC management, etc. Some modifications are made to the derived torque distribution method to adapt itself to various driving conditions. Great attention is also paid to driver-ability and Noise, Vibration, Harshness (NVH) performance in all driving conditions. One embodiment of the present disclosure discloses a method for distributing torque between an engine and an electric motor for an energy efficiency improvement of hybrid electric vehicles, which may include:

A. providing an offline Brake Specific Fuel Consumption (BSFC) map of the engine in all operating states, wherein the offline BSFC map illustrates contours of BSFC values of the engine with a horizontal axis thereof representing rotational speed of the engine and a vertical axis thereof representing torque of the engine, and the all operating states include operating states in which the rotational speed of the engine ranges from 0 to $n_{ENG}$, and for each rotational speed the torque of the engine ranges from 0 to $T_{Eng\_max}$, where $n_{Eng}$ represents a maximum rotational speed the engine can reach, and $T_{Eng\_max}$ represents a torque of external characteristic for each corresponding rotational speed, where the torque of external characteristic $T_{Eng\_max}$ is a net torque obtained by subtracting a frictional torque from an indicated torque of the engine;

B. enabling the engine and the electric motor to collaboratively respond to a demanding torque $T_D$ during traveling, wherein the engine and the electric motor may work in cooperation at a same rotational speed so as to achieve an improved working efficiency; and C. acquiring a current State Of Charge (SOC) of a power battery mounted on the vehicles, and distributing a torque generated by the engine $T_{Eng\_pre}$ and a torque generated by the electric motor $T_{Mac\_pre}$ as follows:

c1. if the SOC is greater than a first preset value, entering a first distribution mode, which means: if $T_D < T_{Mac\_maxCAN}$, setting $T_{Eng\_pre}=0$ and $T_{Mac\_pre}=T_D$, and if $T_D > T_{Mac\_maxCAN}$, setting $T_{Mac\_pre}=T_{Mac\_maxCAN}$ and $T_{Eng\_pre}=T_D-T_{Mac\_maxCAN}$, where $T_{Mac\_maxCAN}$ is a maximum torque constraint value of the electric motor acquired in real time via an in-vehicle network; otherwise, maintaining a current working state; or c2. if the SOC is less than a second preset value, entering a second distribution mode, which means: setting $T_{Eng\_pre}=T_{BSFC}$ and $T_{Mac\_pre}=T_D-T_{BSFC}$, where $T_{BSFC}$ represents a torque of the engine corresponding to a lowest BSFC value in a current rotational speed of the engine, and $T_{BSFC}$ is acquired from the offline BSFC map; and otherwise, maintaining the current working state.

In some embodiments, c2 may further include:
acquiring a maximum torque constraint value of the engine $T_{Eng\_maxCAN}$ in real time via the in-vehicle network, assigning a smaller value of $T_{BSFC}$ and $T_{Eng\_maxCAN}$ to $T_{Eng\_Lim}$, and setting $T_{Eng\_pre}=T_{Eng\_Lim}$, $T_{Mac\_pre}=T_D-T_{Eng\_Lim}$.

In some embodiments, the maximum torque constraint value $T_{Eng\_maxCAN}$ may be acquired from an engine subsystem in the hybrid electric vehicles via the in-vehicle network.

In some embodiments, c2 may further include:
acquiring the maximum torque constraint value of the engine $T_{Eng\_maxCAN}$ in real time via the in-vehicle network, and assigning a smaller value of $T_{BSFC}$ and $T_{Eng\_maxCAN}$ to $T_{Eng\_Lim}$;
implementing a filtering process to $T_{Eng\_Lim}$ to obtain a value $T_{Eng\_split}$, and setting $T_{Eng\_pre}=T_{Eng\_split}$, wherein the filtering process filters out values to prevent intense variation; and acquiring the maximum torque constraint value of the electric motor $T_{Mac\_maxCAN}$ and a minimum torque constraint value of the electric motor $T_{Mac\_minCAN}$, computing an equation $T_D-T_{BSFC}+(T_{Eng\_Lim}-T_{Eng\_split})$, assigning a smaller value between a result of the equation and $T_{Mac\_maxCAN}$ to $T_{Mac\_Lim}$, further assigning a greater value of $T_{Mac\_Lim}$ and $T_{Mac\_minCAN}$ to $T_{Mac\_split}$, thereafter $T_{Mac\_pre}=T_{Mac\_split}$.

In some embodiments, the filtering process may constrain a variation rate of $T_{Eng\_Lim}$ not greater than a torque variation rate of the engine.

In some embodiments, the maximum torque constraint value $T_{Eng\_maxCAN}$ may be acquired from the engine sub-system in the hybrid electric vehicles via the in-vehicle network.

In some embodiments, the maximum torque constraint value $T_{Mac\_maxCAN}$ and the minimum torque constraint value $T_{Mac\_minCAN}$ may be acquired from the engine sub-system in the hybrid electric vehicles via the in-vehicle network.

In some embodiments, the first preset value may not be equal to the second preset value.

In some embodiments, the in-vehicle network may be a CAN network.

The advantages of the present disclosure are: the method for distributing torque between the engine and the electric motor for an energy efficiency improvement of the hybrid electric vehicles disclosed in the present disclosure may rationally and efficiently distribute torque between the engine and the electric motor. Specifically, a demanding torque may be distributed as much as possible to the electric motor when SOC of the power battery is adequate, while the engine may make up the insufficient torque. Thus, the engine may be used as less as possible under circumstances that battery charging from an electric grid is convenient or the battery SOC is always maintained at a high level. In addition, when SOC of the battery is low, the engine working under the improved working efficiency may be mostly guaranteed so as to reduce energy consumption of the vehicles to a minimum level via combining with the electric motor. Accordingly, the method may fully explore performance advantages of the engine and the electric motor so that the whole hybrid electric vehicle system may work at high efficiency all the time, which may greatly reduce energy consumption and harmful emission of the vehicles, and facilitate energy conservation and environmental protection.

BRIEF DESCRIPTION OF THE DRAWINGS

Hereinafter, in conjunction with figures and embodiments, a detailed description of the present disclosure is provided.

FIG. 4 schematically illustrates a diagram presenting a way of obtaining a torque generated by the engine $T_{Eng\_pre}$ for one embodiment of the method for distributing torque between the engine and the electric motor for an energy efficiency improvement of hybrid electric vehicles of the present disclosure; and FIG. 5 schematically illustrates a diagram presenting a way of obtaining a torque of the electric motor $T_{Mac\_pre}$ for one embodiment of the method for distributing torque between the engine and the electric motor for an energy efficiency improvement of hybrid electric vehicles of the present disclosure.

DETAILED DESCRIPTION

It is noted that the preferred embodiments hereinafter are for specifically explaining principles, characteristics and advantages of a method for distributing torque between an engine and an electric motor for an energy efficiency improvement of hybrid electric vehicles of the present disclosure. However, all descriptions are used for explanation, but not posing any constraint to the present disclosure. In addition, any single characteristic described or implied in the following embodiments or figures of the present disclosure may continue being combined and removed arbitrarily among these characteristics (or equivalents) to acquire more other embodiments of the present disclosure, which may not be directly described in the present disclosure.

In order to provide a better understanding of the present disclosure, further explanations and instructions are provided. First, for employing this method, an offline Brake Specific Fuel Consumption (BSFC) map of the engine in all operating states may be required (namely, contours of BSFC values of the engine (g/kWh) are drawn with a horizontal axis thereof representing rotational speed of the engine and a vertical axis thereof representing torque of the engine) as a fundamental reference. The phrase "all operating states" means all operating state points in a matrix consisting of a maximum working rotational speed range of the engine and an external characteristic of engine torque. For example, if a maximum rotational speed of the engine is $n_{Eng}$, a torque of external characteristic for each rotational speed of the engine is $T_{Eng\_max}$ (namely, a frictional torque of the engine is subtracted from an indicated torque of the engine), and thus, the all operating states include operating states in which the rotational speed of the engine ranges from 0 to $n_{Eng}$ and the torque of the engine ranges from 0 to $T_{Eng\_max}$.

Second, the engine and the electric motor (may be single electric motor or multiple electric motors) may be enabled to collaboratively respond to a demanding torque $T_D$ require during travelling, and the electric motor and the engine may work in cooperation at a same rotational speed so as to achieve an improved working efficiency. As stated above, a working efficiency of the engine in the present disclosure may be simply understood as the BSFC values because the BSFC values of the engine may vary greatly under different rotational speeds and torques, which is a major factor affecting fuel consumption.

Figure 1:
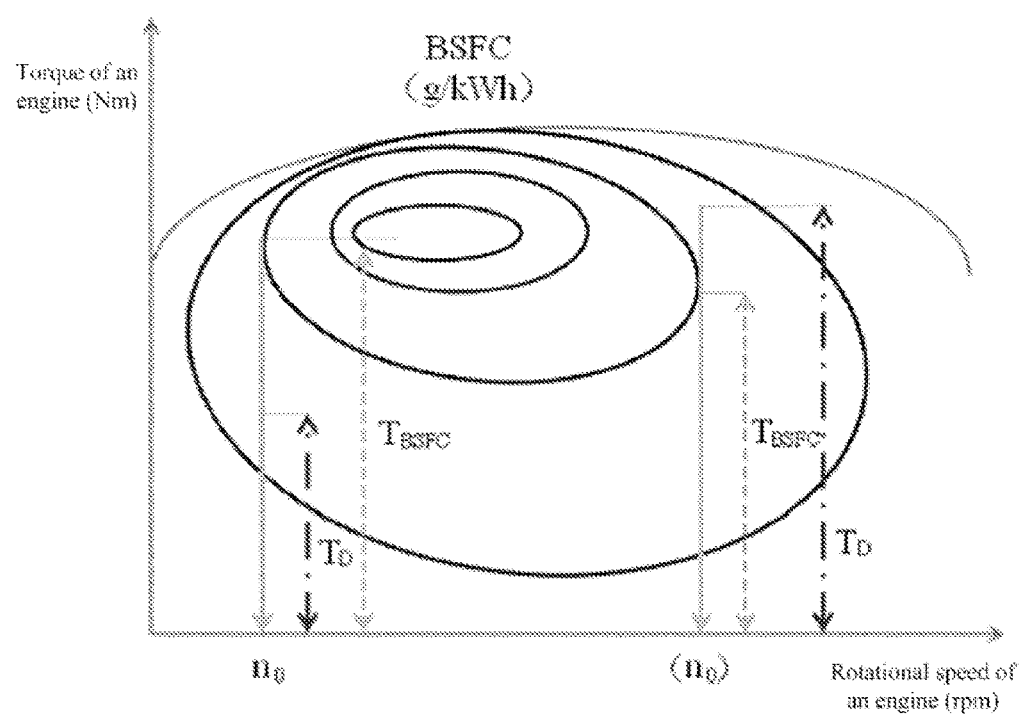
FIG. 1 schematically illustrates a diagram presenting a principle instruction of a method for distributing torque between an engine and an electric motor for an energy efficiency improvement of hybrid electric vehicles of the present disclosure.

Referring to FIG. 1, a computation of an improved working point of the engine is continuously described hereinafter. If in a certain operating state, the rotational speed is $n_0$ and the demanding torque of a powerstain is $T_D$, and a torque $T_{BSFC}$ of a lowest specific fuel consumption point corresponding to the rotational speed $n_0$ may be found via the offline BSFC map. Thus, for the rotational speed $n_0$, if a working torque of the engine $T_{Eng\_pre}$ is equal to $T_{BSFC}$, a torque distributed to the electric motor $T_{Mac\_pre}$ is equal to $T_D-T_{BSFC}$. When $T_D-T_{BSFC}>0$, it means that the demanding torque of the powerstain is greater than the improved working point of the engine, so that the electric motor may be driven to provide a positive force to make up the torque of the engine. When $T_D-T_{BSFC}<0$, it means that the demanding torque of the powerstrain is less than the improved working point of the engine, so that the torque of the engine has an extra torque after responding to the torque of dynamic source, and thereby, the electric motor is required to generate power, where the electric motor provides a negative torque to transfer the extra torque of the engine to electric energy and charging the battery.

In the following, a method for distributing torque between an engine and an electric motor for an energy efficiency improvement of hybrid electric vehicles is provided.

In general, the method may include:

as stated before, providing the offline BSFC map;

in addition, enabling the engine and the electric motor to collaboratively respond to a demanding torque $T_D$ during traveling, and the engine and the electric motor may work in cooperation at a same rotational speed so as to achieve an improved working efficiency;

thereafter, acquiring a current State Of Charge (SOC) of a power battery, and distributing a torque of the engine $T_{Eng\_pre}$ and a torque of the electric motor $T_{Mac\_pre}$ according to the following situations:

step a. if the SOC is greater than a first preset value, entering a first distribution mode, wherein if $T_D<T_{Mac\_maxCAN}$, setting $T_{Eng\_pre}=0$ and $T_{Mac\_pre}=T_D$, and if $T_D>T_{Mac\_maxCAN}$, setting $T_{Mac\_pre}=T_{Mac\_maxCAN}$, $T_{Eng\_pre}=T_D-T_{Mac\_maxCAN}$, where $T_{Mac\_maxCAN}$ is a maximum torque constraint value of the electric motor acquired in real time via an in-vehicle network; otherwise, maintaining a current working state; or step b. if the SOC is less than a second preset value, entering a second distribution mode, wherein $T_{Eng\_pre}=T_{BSFC}$ ($T_{BSFC}$ is a torque of the engine corresponding to a lowest BSFC value acquired from the offline specific fuel consumption map according to a current rotational speed of the engine), and $T_{Mac\_pre}=T_D-T_{BSFC}$; and otherwise, maintaining the current working state.

Figure 2:
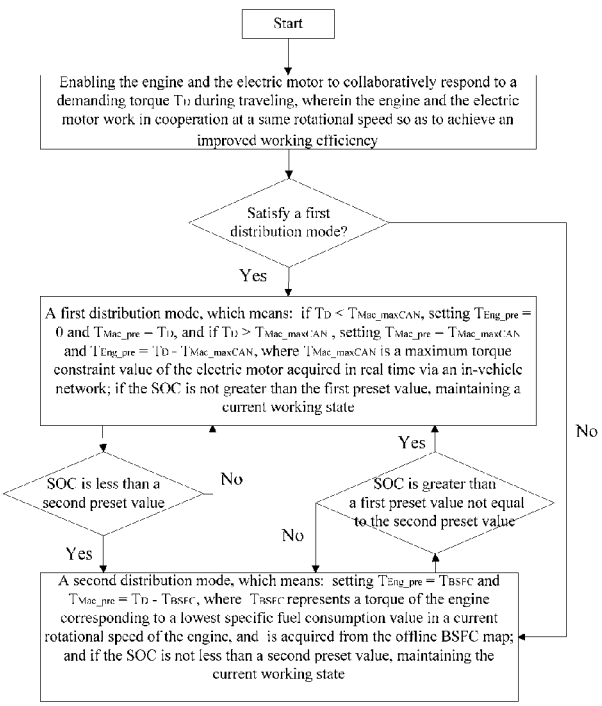
FIG. 2 schematically illustrates a flow diagram presenting a transfer logic between a first distribution mode and a second distribution mode for one embodiment of the method for distributing torque between the engine and the electric motor for an energy efficiency improvement of hybrid electric vehicles of the present disclosure.

In some embodiments, the first preset value may not be equal to the second preset value, which is to avoid frequent mode changes of the torque distribution between the engine and the electric motor in a hybrid system. Moreover, at a moment of the hybrid electric vehicles start, the condition whether the SOC is greater than a first preset value may be checked to determine either the first distribution mode or the second distribution mode is entered after the hybrid electric vehicles start, which is shown in FIG. 2.

Besides, further changes may be made to the method for distributing torque between the engine and the electric motor of an energy efficiency improvement of hybrid electric vehicles.

In some embodiments, referring to FIG. 4, the step b may further include: acquiring a maximum torque constraint value of the engine $T_{Eng\_maxCAN}$ in real time (e.g. the parameter may be acquired from an engine sub-system in the hybrid electric vehicles via the in-vehicle network, or other components, modules or devices in the hybrid electric vehicles), and a smaller value of $T_{BSFC}$ and is $T_{Eng\_maxCAN}$ assigned to $T_{Eng\_Lim}$, which is the real split torque of the engine $T_{Eng\_pre}$, and thereafter, according to the description stated hereinbefore, the torque of the electric motor $T_{Mac\_pre}$ is further determined by $T_{Mac\_pre}=T_D-T_{Eng\_Lim}$.

Figure 3:
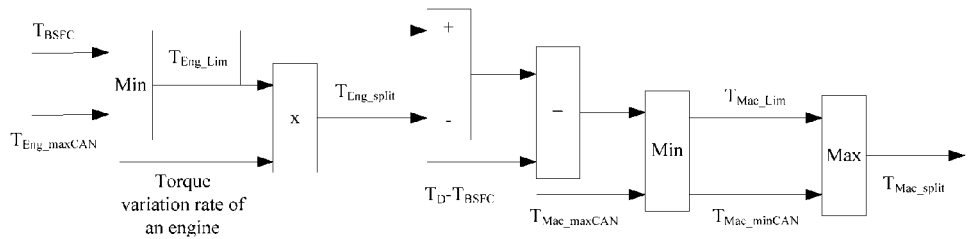
FIG. 3 schematically illustrates a diagram presenting a computational logic of $T_{Eng\_split}$ and $T_{Mac\_split}$ for embodiments of the method for distributing torque between the engine and the electric motor of an energy efficiency improvement of hybrid electric vehicles of the present disclosure.

In some embodiments, referring to FIG. 3 and FIG. 5, the step b may further include:

acquiring a maximum torque constraint value of the engine $T_{Eng\_maxCAN}$ in real time (e.g. the parameter may be acquired from the engine sub-system in the hybrid electric vehicles via the in-vehicle network, or other components, modules or devices in the hybrid electric vehicles), and a smaller value of $T_{BSFC}$ and $T_{Eng\_maxCAN}$, is assigned to $T_{Eng\_Lim}$, which also is the real split torque distributed to the engine $T_{Eng\_pre}$;

and filtering $T_{Eng\_Lim}$(e.g. it may be achieved via constraining a variation rate of $T_{Eng\_Lim}$ not greater than a torque variation rate of the engine or other proper values) for preventing a value of $T_{Eng\_Lim}$ from intense variation (namely, it may avoid the torque from intense variation under an operating state change) to acquire $T_{Eng\_split}$, which also is the torque of the engine $T_{Eng\_pre}$;

thereafter, acquiring a maximum torque constraint value of the electric motor $T_{Mac\_maxCAN}$ in real time and a minimum torque constraint value of the electric motor $T_{Mac\_minCAN}$ (e.g. the parameters may be acquired from the electric motor sub-system in the hybrid electric vehicles via the in-vehicle network, or other components, modules or devices in the hybrid electric vehicles); since the torque of the engine is filtered, a deviation may be generated between $T_{Eng\_split}$ and $T_{Eng\_Lim}$, and thereby, a corresponding compensation to the torque of the electric motor may be required by computing an equation $T_D-T_{BSFC}+(T_{Eng\_Lim}-T_{Eng\_split})$, and a smaller value between a result of the equation and $T_{Mac\_maxCAN}$ is assigned to $T_{Mac\_Lim}$ and a greater value of $T_{Mac\_Lim}$ and $T_{Mac\_minCAN}$ is assigned to $T_{Mac\_split}$, which also is the real split torque distributed to the electric motor $T_{Mac\_pre}$.

The above embodiments describe in detail about the method for distributing torque between the engine and the electric motor for an energy efficiency improvement of hybrid electric vehicles of the present disclosure, which are only used for explaining principles and implementations of the present disclosure but not for posing any constraint to the present disclosure, and those skilled in the art may modify and vary the embodiments without departing from the spirit and scope of the present disclosure. Therefore, the present disclosure should not be limited by the embodiments disclosed herein.

What is claimed is:

1. A method for distributing torque between an engine and an electric motor for an energy efficiency improvement of hybrid electric vehicles, comprising:

A. providing an offline Brake Specific Fuel Consumption (BSFC) map of the engine in all operating states, wherein the offline BSFC map illustrates contours of BSFC values of the engine with a horizontal axis thereof representing rotational speed of the engine and a vertical axis thereof representing torque of the engine, and the all operating states include operating states in which the rotational speed of the engine ranges from 0 to $n_{Eng}$, and for each rotational speed the torque of the engine ranges from 0 to $T_{Eng\_max}$, where $n_{Eng}$ represents a maximum rotational speed the engine can reach, and $T_{Eng\_max}$ represents a torque of external characteristic for each corresponding rotational speed, where the torque of external characteristic $T_{Eng\_max}$ is a net torque obtained by subtracting a frictional torque from an indicated torque of the engine;

B. enabling the engine and the electric motor to collaboratively respond to a demanding torque $T_D$ during traveling, wherein the engine and the electric motor work in cooperation at a same rotational speed so as to achieve an improved working efficiency; and C. acquiring a current State Of Charge (SOC) of a power battery mounted on the vehicles, and distributing a torque generated by the engine $T_{Eng\_pre}$ and a torque generated by the electric motor $T_{Mac\_pre}$ as follows:

c1. if the SOC is greater than a first preset value, entering a first distribution mode, which means: if $T_D < T_{Mac\_maxCAN}$, setting $T_{Eng\_pre}=0$ and $T_{Mac\_pre}=T_D$, and if $T_D > T_{Mac\_maxCAN}$, setting $T_{Mac\_pre}=T_{Mac\_maxCAN}$ and $T_{Eng\_pre}=T_D-T_{Mac\_maxCAN}$, where $T_{Mac\_maxCAN}$ is a maximum torque constraint value of the electric motor acquired in real time via an in-vehicle network; if the SOC is not greater than the first preset value, maintaining a current working state; or c2. if the SOC is less than a second preset value, entering a second distribution mode, which means: setting $T_{Eng\_pre}=T_{BSFC}$ and $T_{Mac\_pre}=T_D-T_{BSFC}$, where $T_{BSFC}$ represents a torque of the engine corresponding to a lowest specific fuel consumption value in a current rotational speed of the engine, and $T_{BSFC}$ is acquired from the offline BSFC map; and if the SOC is not less than a second preset value, maintaining the current working state.

2. The method according to claim 1, wherein c2 further comprises
acquiring a maximum torque constraint value of the engine $T_{Eng\_maxCAN}$ in real time via the in-vehicle network, and setting $T_{Eng\_pre}=T_{Eng\_Lim}$, wherein $T_{Eng\_Lim}$ is a smaller value of $T_{BSFC}$ and $T_{Eng\_maxCAN}$, $T_{Mac\_pre}=T_D-T_{Eng\_Lim}$.

3. The method according to claim 2, wherein the maximum torque constraint value $T_{Eng\_maxCAN}$ is acquired from an engine sub-system in the hybrid electric vehicles via the in-vehicle network.

4. The method according to claim 3, wherein the first preset value is not equal to the second preset value.

5. The method according to claim 3, wherein the in-vehicle network is a Controller Area Network.

6. The method according to claim 2, wherein the first preset value is not equal to the second preset value.

7. The method according to claim 2, wherein the in-vehicle network is a Controller Area Network.

8. The method according to claim 1, wherein c2 further comprises:

acquiring the maximum torque constraint value of the engine $T_{Eng\_maxCAN}$ in real time via the in-vehicle network, and wherein a smaller value of $T_{BSFC}$ and $T_{Eng\_maxCAN}$ is defined as $T_{Eng\_Lim}$;

implementing a filtering process to $T_{Eng\_Lim}$ to obtain a value of $T_{Eng\_split}$, and setting $T_{Eng\_pre}=T_{Eng\_split}$, wherein the filtering process filters out values to prevent intense variation; and acquiring the maximum torque constraint value of the electric motor $T_{Mac\_maxCAN}$ and a minimum torque constraint value of the electric motor $T_{Mac\_minCAN}$, computing an equation $T_D-T_{BSFC}+(T_{Eng\_Lim}-T_{Eng\_split})$, wherein a smaller value of a result of the equation and $T_{Mac\_maxCAN}$ is defined as $T_{Mac\_Lim}$, further a greater value of $T_{Mac\_Lim}$ and $T_{Mac\_minCAN}$ is defined as $T_{Mac\_split}$, thereafter $T_{Mac\_pre}=T_{Mac\_split}$.

9. The method according to claim 8, wherein the filtering process constrains a variation rate of $T_{Eng\_Lim}$ greater than a torque variation rate of the engine.

10. The method according to claim 9, wherein the maximum torque constraint value $T_{Eng\_maxCAN}$ is acquired from an engine sub-system in the hybrid electric vehicles via the in-vehicle network.

11. The method according to claim 9, wherein the maximum torque constraint value $T_{Mac\_maxCAN}$ and minimum torque constraint value $T_{Mac\_minCAN}$ are acquired from an electric motor sub-system in the hybrid electric vehicles via the in-vehicle network.

12. The method according to claim 9, wherein the first preset value is not equal to the second preset value.

13. The method according to claim 9, wherein the in-vehicle network is a Controller Area Network.

14. The method according to claim 8, wherein the maximum torque constraint value $T_{Eng\_maxCAN}$ is acquired from an engine sub-system in the hybrid electric vehicles via the in-vehicle network.

15. The method according to claim 8, wherein the maximum torque constraint value $T_{Mac\_maxCAN}$ and minimum torque constraint value $T_{Mac\_minCAN}$ are acquired from an electric motor sub-system in the hybrid electric vehicles via the in-vehicle network.

16. The method according to claim 8, wherein the first preset value is not equal to the second preset value.

17. The method according to claim 8, wherein the in-vehicle network is a Controller Area Network.

18. The method according to claim 1, wherein the first preset value is not equal to the second preset value.

19. The method according to claim 1, wherein the in-vehicle network is a Controller Area Network.

* * * * *

UNITED STATES PATENT AND TRADEMARK OFFICE
CERTIFICATE OF CORRECTION

PATENT NO. : 9,637,110 B2
APPLICATION NO. : 14/649513
DATED : May 2, 2017
INVENTOR(S) : Yuxing Zhou et al.

It is certified that error appears in the above-identified patent and that said Letters Patent is hereby corrected as shown below:

In the Claims

• Please replace – $T_{Eng\_pre} = -T_{Mac\_maxCAN}$ – in Column 7, Line 14 with "$T_{Eng\_pre} = T_D - T_{Mac\_maxCAN}$"

• Please replace – $T_{Eng\_Lim}$ greater than – in Column 8, Line 18 with "$T_{Eng\_Lim}$ not greater than"

Signed and Sealed this
Third Day of October, 2017

Joseph Matal
*Performing the Functions and Duties of the*
*Under Secretary of Commerce for Intellectual Property and*
*Director of the United States Patent and Trademark Office*